(12) United States Patent
Zhang et al.

(10) Patent No.: US 9,377,153 B2
(45) Date of Patent: Jun. 28, 2016

(54) MULTI-USE DISPLAY SCREEN SUPPORT DEVICE

(71) Applicant: Shenzhen China Star Optoelectronics Technology Co. Ltd., Shenzhen, Guangdong (CN)

(72) Inventors: Zuwei Zhang, Guangdong (CN); Guofu Tang, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 14/395,820

(22) PCT Filed: Sep. 17, 2014

(86) PCT No.: PCT/CN2014/086733
§ 371 (c)(1),
(2) Date: Oct. 21, 2014

(87) PCT Pub. No.: WO2016/037377
PCT Pub. Date: Mar. 17, 2016

(65) Prior Publication Data
US 2016/0073777 A1    Mar. 17, 2016

(30) Foreign Application Priority Data
Sep. 12, 2014  (CN) .......................... 2014 1 0466128

(51) Int. Cl.
| | | |
|---|---|---|
| A47F 5/00 | (2006.01) |
| A47F 7/00 | (2006.01) |
| F16M 11/04 | (2006.01) |
| F16M 11/42 | (2006.01) |
| F16M 11/22 | (2006.01) |

(52) U.S. Cl.
CPC ............... *F16M 11/04* (2013.01); *F16M 11/22* (2013.01); *F16M 11/42* (2013.01)

(58) Field of Classification Search
CPC ....................................................... B62B 3/108
See application file for complete search history.

(56) References Cited

U.S. PATENT DOCUMENTS

| 5,584,635 A | * | 12/1996 | Stapelmann | ............. | B25H 1/00 414/11 |
|---|---|---|---|---|---|
| 6,338,758 B1 | * | 1/2002 | Curran | ................ | B05B 13/0285 118/500 |
| 2007/0221807 A1 | * | 9/2007 | Park | ....................... | F16M 11/10 248/324 |
| 2010/0237210 A1 | * | 9/2010 | Anderson | .............. | F16M 11/04 248/274.1 |
| 2012/0086680 A1 | * | 4/2012 | Ueda | ........................ | G09G 5/14 345/204 |
| 2015/0246681 A1 | * | 9/2015 | Raper, Jr. | ................ | B62B 3/108 254/4 R |

* cited by examiner

*Primary Examiner* — Amy Sterling
(74) *Attorney, Agent, or Firm* — Andrew C. Cheng

(57) ABSTRACT

The multi-use display screen support device comprises a seat body and the support arm connecting with the seat body, where the connecting end of the support arm connects with the seat body via a fastener. The connecting end of the support arm can swing in a horizontal plane. The free end of the support arm connects with the transition assembly connecting with the external back hanging structure used in the display screen. The support arm can be adjusted in the certain range to fit many kinds of size, plane and curved surface of different shape display screen. Therefore, the requirement of the industry production transportation can be satisfied, and the cost of the production and transportation can be reduced.

9 Claims, 4 Drawing Sheets

MULTI-USE DISPLAY SCREEN SUPPORT DEVICE

FIELD OF THE INVENTION

The present invention relates to the support device of the operating display screen.

BACKGROUND OF THE INVENTION

With the development of the society and technology, people's life standards improve and the large size television and curved-surface television become more and more popular. Correspondingly, the size of the display screen is made larger and larger and the turnover of the large size and curved surface display screen is more and more difficult. Because the display screen is easy to be damaged, it is not realistic that a person lifts a single large size display screen to move somewhere. Therefore, the large size display screens usually have the design of the external back hanging structure used for the turnover by logistics trolleys. That means that the shape and position of the external back hanging structure on the back plate of the different size flat display screen and the different curvature radius display screen might be different. If the different kinds of the logistics trolleys are designed to solve the issue, it will cause many kinds of the logistics trolleys exist and the weaknesses of the wasting cost, the burden of the management and the occupying of the storage space will appear.

SUMMARY OF THE INVENTION

In order to solve the weaknesses existing in the prior art, the present invention provides a multi-use display screen support device.

The multi-use support device comprises a seat body and a support arm connecting with the seat body, where the connecting end of the support arm connects with the seat body via the fastener and the free end of the support arm swings in a horizontal plane, and connects with the transition assembly connecting with the external back hanging structure used in a display screen.

The long strip shape connecting aperture is located in the connecting end of the support arm, and the fastener is a bolt which passes through the connecting aperture to make the support arm and the seat body connect together.

The support arm is a square tube, and a large hypotenuse structure is located in one side of the free end of the square tube which the other side of the free end of the square tube connects with the transition assembly.

The transition assembly is an adapter plate which connects the free end of the support arm via a fastener.

The transition assembly further comprises a reinforcing member, and the reinforcing member at least comprises two panels fixedly connects together, wherein the first panel fixedly connects with the adapter plate and the second panel fixedly connects with the support arm.

The reinforcing member consists of three panels fixedly connecting vertically to each other.

The adapt plate is installed in vertical direction, and two sides of the adapter plate respectively extend side plates 311 back from the support arm.

The upper end of the adapter plate bends to the direction of the side plate and the height of the upper end of the adapter plate equals to the height of the side plate.

The seat body comprises two beams installed in opposite sides of the seat body, and a plurality of mounting holes are located on the beams for connecting the support arm, and a fastener passes through the mounting hole and the connecting aperture of the support arm for connecting the seat body and the support arm.

The beam is a square tube, and the seat body further comprises two angle irons for connecting with the beams, and the seat body further comprises two wheels for connecting with the beams or the angle irons or the bottom end.

The present invention provides the kind of the support arm which can modulate in the certain range to fit many kinds of size, plane and curved surface of different shape display screen. Therefore, the requirement of the industry production transportation can be satisfied, and the cost of the production and transportation can be reduced.

DETAILED DESCRIPTION OF THE PREFERRED EMBODIMENTS

The detailed explanation of the present invention is the following embodiment and figures. The support device of the present invention can modulate the extension length and angle of the support arm to adjust for different display screens having different size and curvature. The detailed explanation of the present invention is the following embodiment and figures.

Figure 1:
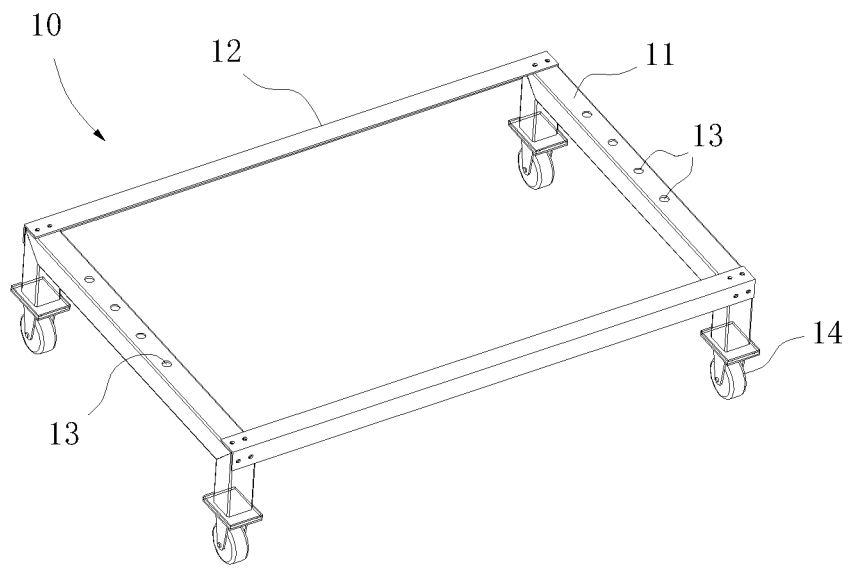
FIG. 1 is the schematic diagram of the seat body of the embodiment of the present invention.

Please refer to FIG. 1. The seat body 10 of the support device of the embodiment comprises two beams 11 set in the opposite sides and two angle irons 12 connecting with the beams 11. The beams are square tubs, and there are few mounting holes 13 on the beams 11 for connecting with the support arm 20. The wheels 14 are installed in the bottom end of the seat body where the beam 11 connects with the angle iron 12, and the wheels have brakes.

Figure 2:
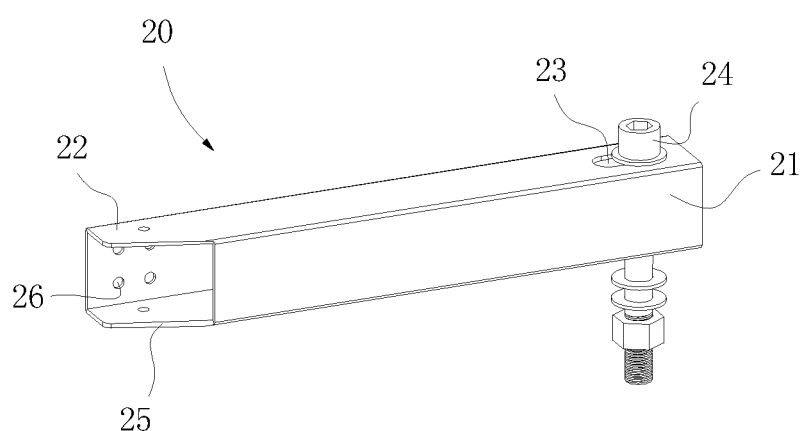
FIG. 2 is the schematic diagram of the support arm of the embodiment of the present invention.
Figure 3:
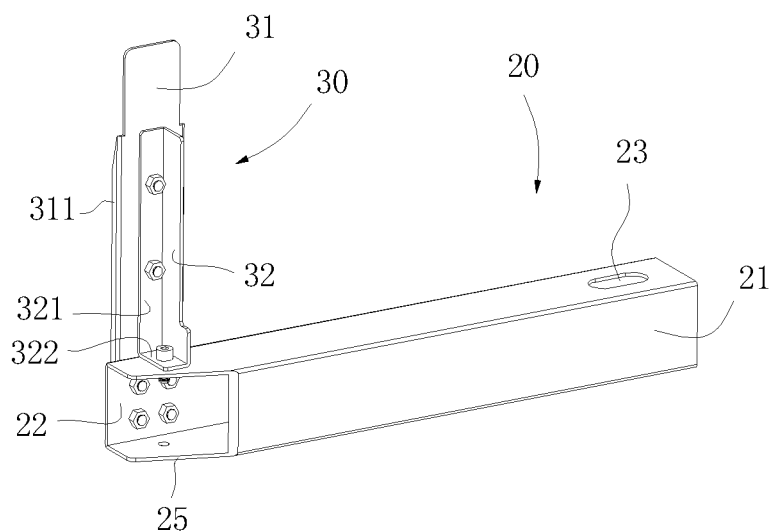
FIG. 3 is the schematic diagram of the connection of the support arm and the transition assembly of the embodiment of the present invention.
Figure 4:
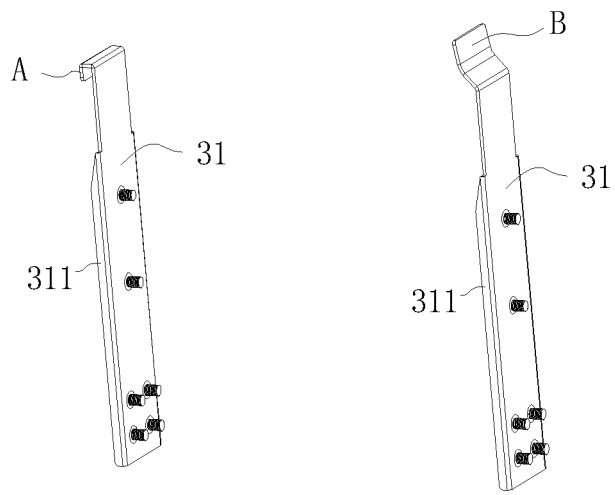
FIG. 4 is the schematic diagram of the adaptor plate of the embodiment of the present invention.

Please refer to FIG. 2. The support arm 20 is a square tube which comprises a connecting end 21 and a free end 22 and the connecting end 21 has a long strip connecting aperture 23. The mounting hole 13 on the beam 11 connects with the connecting aperture 23 via a fastener 24 which is a bolt. It can be understood that the free end 22 of the support arm 20 swings in a horizontal plane to achieve that the support arm can place certain angle to adjust to the display screens having different curved surface with different curvature. The free end 22 of the support arm 20 is used to connecting with the transition assembly 30 which connects with one side of the free end 22 of the square tube, and the other side of the free end of the square tube has a large hypotenuse structure 25. Please refer to FIG. 3 the transition assembly 30 is an adapter plate 31 for connecting with the external back hanging structure used in a display screen. The adapter plate 31 is set in the vertical direction and two sides of the adapter plate 31 respectively extend side plates 311 back from the support arm 20 for more strengthening. In other embodiment, the adapter plate 31 bends toward the side plate 311 and the height of the upper end of the adapter plate 31 equals to the height of the side plate 311. The two means shown in FIG. 4 can be implemented, which end A of the adapter plate 31 can be folded shape and end B of the adapter plate 31 can be bent to be step shape. The adapter plate 31 connects with the free end 22 of the support arm 20, as shown in the drawing. The connecting hole 26 is located in the bottom end of the adapter plate 31 and a side wall of the free end 22 of the square tube 20, and they are fixed via a screw and a nut. A riveting column having the external thread on one side can be used instead of the screw. The riveting column connects with the bottom end of the adapter plate 31 first and the external thread passes through the connecting hole 26 fixed by the nut. Moreover, the large hypotenuse structure is designed for manipulating the nut conveniently. Otherwise, considering of the transition plate 31 of which the bottom part connects with the support arm 20, most of the other transition plates 31 still need to sustain the weight of the display screen. Therefore a reinforcing member 32 is provided for strengthening the firmness of the transition plate 31. As shown in figure, the reinforcing member 32 consists of the three plates connecting vertically with each other. The first panel 321 fixedly connects with the transition plate 31, and the other plate 322 fixedly connects with the free port 22 of the square tube of the support arm 20 where a screw is utilized for the fixed connection.

Figure 5:
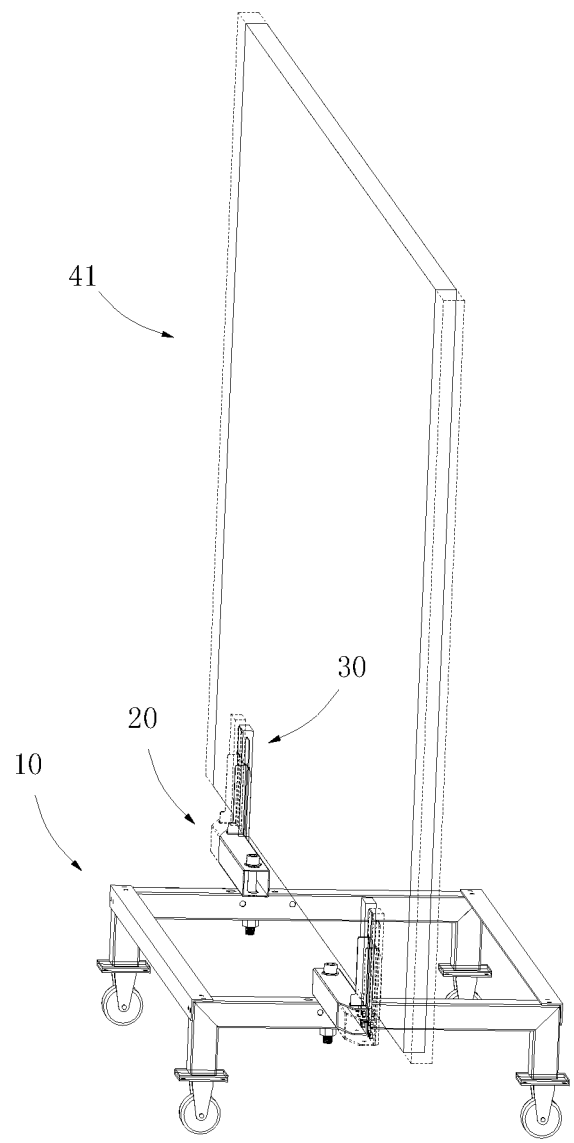
FIG. 5 is the state diagram of the flat display screen placed in the support device of the embodiment of the present invention.
Figure 6:
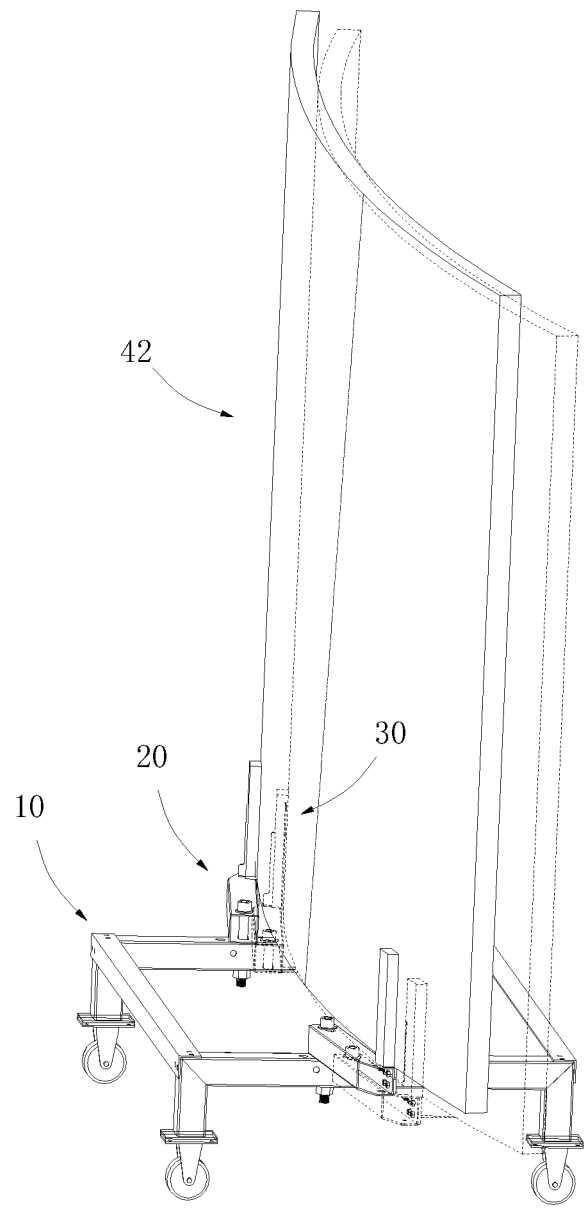
FIG. 6 is the state diagram of the different curvature display screen placed in support device of the embodiment of the present invention.

The above mentioned seat body 10, the support arm 20, and the transition assembly 30 are assembled to form the support device of the present invention. The use state is shown in FIG. 5 and FIG. 6 after assembling. When operating the flat display screen 41, the screen size only needs to be considered. As shown in FIG. 5, the support arm 20 installed on the two beams 11 via the bolts first and the transition plate 31 on the support arm 20 have to be in the same plane. Also, the flat display screen 41 is disposed on the support device and then the bolts are tightened. At last, the external back hanging structure of the flat display screen connects with the transition plate 31 to achieve the purpose of the flat display screen 41 fixed on the support device. When the size of the display screen is larger and it is not stable and balance enough that the original support arm 20 supports that kind of the display screen, the support arm can be modulated by the following steps: First loose the bolts and then pull out the two side support arms 20. At this time, because the connecting aperture 23 of the connecting end 21 is long strip shape, the bolt is installed to the farthest end of the support arm 20 to achieve the largest difference of the spacing of the two support arms 20. The bolts can be fastened after modulating such that it is suitable for the operation of the larger size flat display screen 41. And then please refer to FIG. 5. If the support device needs to adopt the curved surface display having different curvature, the support arm 20 needs to modulate the angle of the swing to achieve it in the following steps: First loose the bolts (fastener 24) connecting with the support arm 20 and the seat body 10. Swing the two side support arms 20 to fit the plane of the two transition plates 31 to the curve surface of the curved surface display screen. The present invention relates to the support device of the operating display screen. The present invention relates to the support device of the operating display screen. 42. The bolts are fastened and the support device is completed. Otherwise, there are several mounting holes on the beams 11, and it can be installed several support arms 20. Perhaps, the distance of the mounting holes 13 is used to modulate the spacing of the support arm 20.

The foregoing preferred embodiments of the present invention are illustrative, rather than limiting, of the present invention. It is intended that they cover various modifications, and similar arrangements be included within the spirit and scope of the appended claims, the scope of which should be accorded the broadest interpretation so as to encompass all such modifications and similar structures.

What is claimed is:

1. A multi-use display screen support device, comprising a seat body and a support arm connecting with the seat body, wherein the support arm is a square tube, a connecting end of the support arm connects with the seat body via a fastener, a long strip shape connecting aperture is located in the connecting end, and the fastener is a bolt, which passes through the connecting aperture to make the support arm and the seat body connect together, a free end of the support arm swings in a horizontal plane, and connects with a transition assembly connecting with an external back hanging structure used in a display screen, a large hypotenuse structure is located in one side of the free end of the support arm which the other side of the free end of the support arm connects with the transition assembly.

2. The multi-use display screen support device as claimed in claim 1, wherein the transition assembly is an adapter plate, which the adapter plate connects the free end of the support arm via a fastener.

3. The multi-use display screen support device as claimed in claim 2, wherein the transition assembly further comprises a reinforcing member, and the reinforcing member at least comprises two panels fixedly connects together, wherein the first panel fixedly connects with the adapter plate, and the second panel fixedly connects with the support arm.

4. The multi-use display screen support device as claimed in claim 3, wherein the reinforcing member consists of three panels fixedly connecting vertically to each other.

5. The multi-use display screen support device as claimed in claim 2, wherein the adapter plate is installed in vertical direction, and two sides of the adapter plate respectively extend away from a direction of the support arm.

6. The multi-use display screen support device as claimed in claim 2, wherein the adapter plate is installed in vertical direction, and two sides of the adapter plate respectively extend side plates back from the support arm.

7. The multi-use display screen support device as claimed in claim 5, wherein an upper end of the adapter plate bends to the direction of the side plate and height of the upper end of the adapter plate equals to height of the side plate.

8. The multi-use display screen support device as claimed in claim 1, wherein the seat body comprises two beams installed in opposite sides of the seat body, and a plurality of mounting holes are located on the beams for connecting the support arm, and a fastener passes through the mounting hole and the connecting aperture of the support arm connecting the seat body and the support arm.

9. The multi-use display screen support device as claimed in claim 8, wherein the beam is a square tube, and the seat body further comprises two angle irons for connecting with the beams, and the seat body further comprises two wheels connecting with the beams or the angle irons or bottom end beside the beams and angle irons.

* * * * *